United States Patent [19]
Walther et al.

[11] 3,877,754
[45] Apr. 15, 1975

[54] DUAL RIM AND WHEEL ASSEMBLY

[75] Inventors: William D. Walther, Dayton; Robert A. DeRegnaucourt, Centerville, both of Ohio

[73] Assignee: The Dayton Steel Foundry Company, Dayton, Ohio

[22] Filed: May 11, 1972

[21] Appl. No.: 252,412

[52] U.S. Cl................................ 301/13 SM; 301/13 R
[51] Int. Cl............................................. B60b 23/10
[58] Field of Search...301/11 R, 10 R, 13 R, 13 SM, 301/9 R, 18, 19, 20, 36 R

[56] References Cited
UNITED STATES PATENTS

| | | | |
|---|---|---|---|
| 1,923,811 | 8/1933 | Burger | 301/12 R |
| 1,927,579 | 9/1933 | Walther | 301/12 R |
| 2,486,569 | 11/1949 | Malthaner | 301/36 R |
| 2,623,792 | 12/1952 | Mills | 301/13 SM |
| 2,826,456 | 3/1958 | Atkin | 301/11 R |
| 2,826,457 | 3/1958 | Sinclair | 301/36 R |
| 2,884,280 | 4/1959 | Atkin | 301/13 SM |
| 3,382,007 | 5/1968 | DeRegnaucourt | 301/13 SM |

FOREIGN PATENTS OR APPLICATIONS

| | | | |
|---|---|---|---|
| 1,095,210 | 12/1954 | France | 301/13 R |
| 337,432 | 3/1936 | Italy | 301/13 SM |
| 756,934 | 10/1933 | France | 301/13 SM |
| 283,621 | 10/1952 | Switzerland | 301/13 R |

Primary Examiner—Lloyd L. King
Assistant Examiner—Reinhard J. Eisenzopf
Attorney, Agent, or Firm—Mack D. Cook, II

[57] ABSTRACT

A dual rim and wheel assembly including a series of axially inner clamp means and a series of axially outer clamp lugs to cooperatively engage the mounting flanges of dual rims separated by a spacer. The wheel has means thereon for positive positioning of the clamp means. The clamp means and the clamp lugs each have intersecting surfaces for engaging seating and positioning surfaces on the dual rims. Each set of a clamp means and a clamp lug is supported by a fastening element extending axially through the wheel. The fastening elements carry fastening means which draw the clamp means and the clamp lugs together to seat the rim flanges.

2 Claims, 7 Drawing Figures

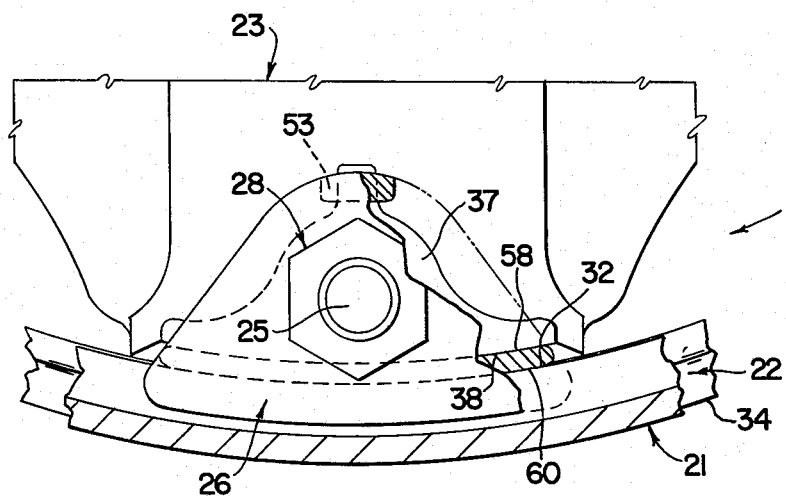
FIG. 2
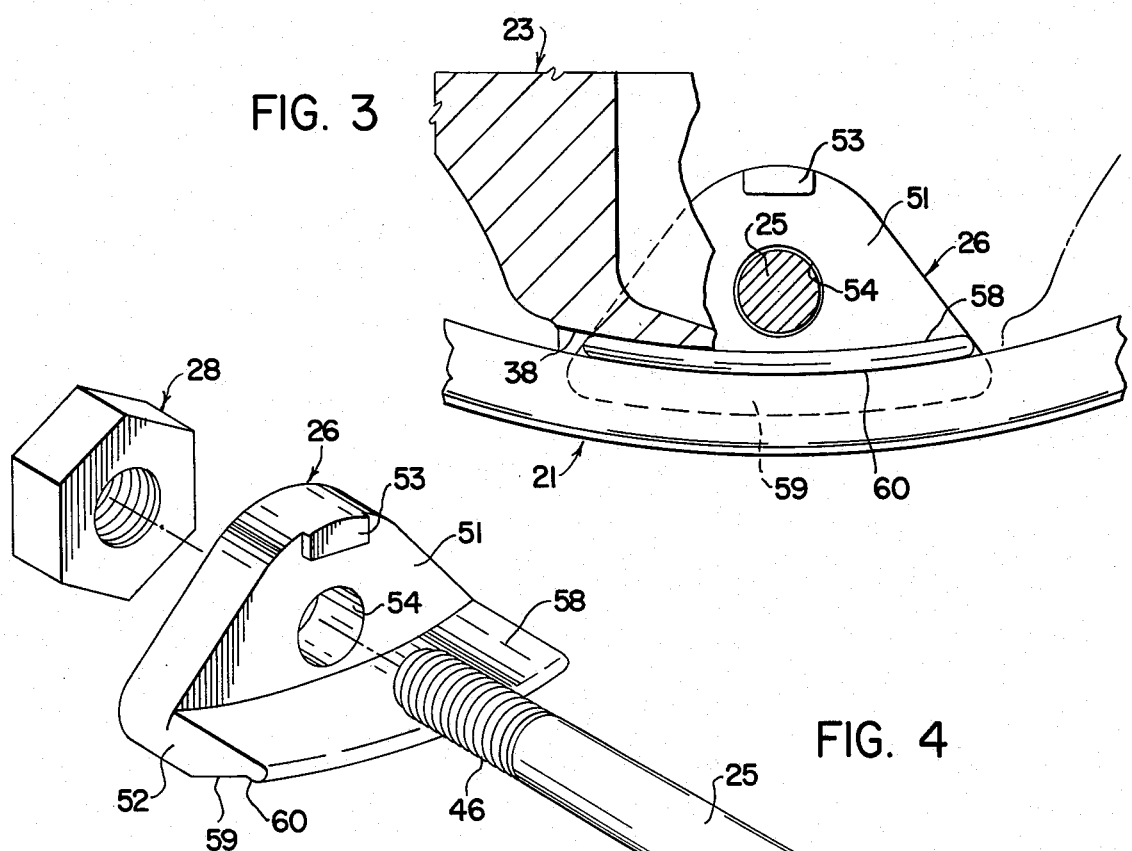
FIG. 3
FIG. 4

DUAL RIM AND WHEEL ASSEMBLY

CROSS-REFERENCE TO RELATED APPLICATIONS

The subject matter of this invention is related to the subject matter of co-pending application Ser. No. 252,411 filed May 11, 1972. One form of spacer disclosed, as used in a dual rim and wheel assembly according to the invention, is the subject matter of co-pending application Ser. No. 252,413 filed May 11, 1972.

BACKGROUND OF THE INVENTION

The invention relates to a dual rim and wheel assembly. More particularly, the invention relates to dual tire carrying rims mounted on a wheel, such as the rear wheel, of a vehicle, such as a truck or trailer.

The prior art has many forms of rim and wheel assemblies, for both single rim and dual rim mountings. U.S. Pat. Nos. 3,623,772 and No. 3,623,773, patented November/1971 to The Dayton Steel Foundry Company, disclose dual rim and wheel assemblies, utilizing deformable spacers to maintain lateral alignment and minimize radial runout of the rims when mounted. U.S. Pat. Nos. 3,382,006 and 3,382,007, patented May/1968, to The Dayton Steel Foundry Company, disclose dual rim and wheel assemblies, utilizing rigid spacers.

Heretofore, the commercially available and known prior art rim and wheel assemblies have utilized the wheel, per se, for the mounting of at least one, usually the inner, of the rims. The wheel has been provided with cooperative and intersecting surfaces, a horizontal felloe, felly or load-bearing surface intersecting a radially directed surface, to seat the mounting flange on the inner rim. Once seated, the inner rim and a spacer were held in place by highly stressed or torqued fastening means, such as a series of nuts on threaded bolts projecting axially of the wheel, forcing or driving clamp lugs into engagement with the mounting flange on the outer rim.

The prior art dual rim and wheel assemblies, utilizing either a deformable or a rigid spacer, have performed well. However, it has now been found that what may appear as insignificant differences as to dimensions, configurations and relative locations of dual rim and wheel assembly components can — and with this invention do — produce remarkably improved results or advantages. The improvements provided by the present invention are particularly manifest in assuring lateral alignment and minimizing radial runout of the rims when mounted, regardless of the technique employed by the mechanic in assembling the rims on a wheel. It has been found that no "judgment" is needed by a mechanic in mounting a dual rim and wheel assembly according to the invention.

SUMMARY OF THE INVENTION

The object of the invention is to provide an improved dual rim and wheel assembly.

It is a further object of the invention to provide a dual rim and wheel assembly having components which will assure lateral alignment and minimize radial runout of the rims when mounted on the wheel.

These and other objects of the invention, and the advantages thereof, will be apparent in view of the Description of a Preferred Embodiment, and Alternative Embodiments, as set forth below.

In general, a dual rim and wheel assembly according to the invention comprises, a wheel, a rigid spacer, a series of axially inner clamp means, and a series of axially outer clamp lugs to cooperatively engage mounting surfaces on the flanges of the rims. The wheel has a peripheral portion with means thereon for positive positioning of the clamp means.

The clamp means have intersecting surfaces thereon for engaging an axially inner and a radially inner surface on the flange of the inner rim. The clamp lugs have intersecting surfaces thereon for engaging an axially inner and a radially inner surface on the flange of the outer rim.

Each set of a clamp means and a clamp lug is supported by a fastening element extending axially through the wheel and carrying fastening means attached axially outwardly of the wheel and the clamp lugs. The clamp means and the clamp lugs are drawn or pulled axially together to seat the rim flanges between the rigid spacer by tightening the fastening means on the fastening elements.

DESCRIPTION OF THE DRAWINGS

FIG. 2 is an axially outer plan view of a dual rim and wheel assembly, taken substantially as indicated on line 2—2 of FIG. 1;

FIG. 3 is an axially inner plan view of a dual rim and wheel assembly, taken substantially as indicated on line 3—3 of FIG. 1;

FIG. 4 is an exploded view showing a clamp means, clamp lug, and fastening means according to the invention;

DETAILED DESCRIPTION OF THE INVENTION

Figure 1:
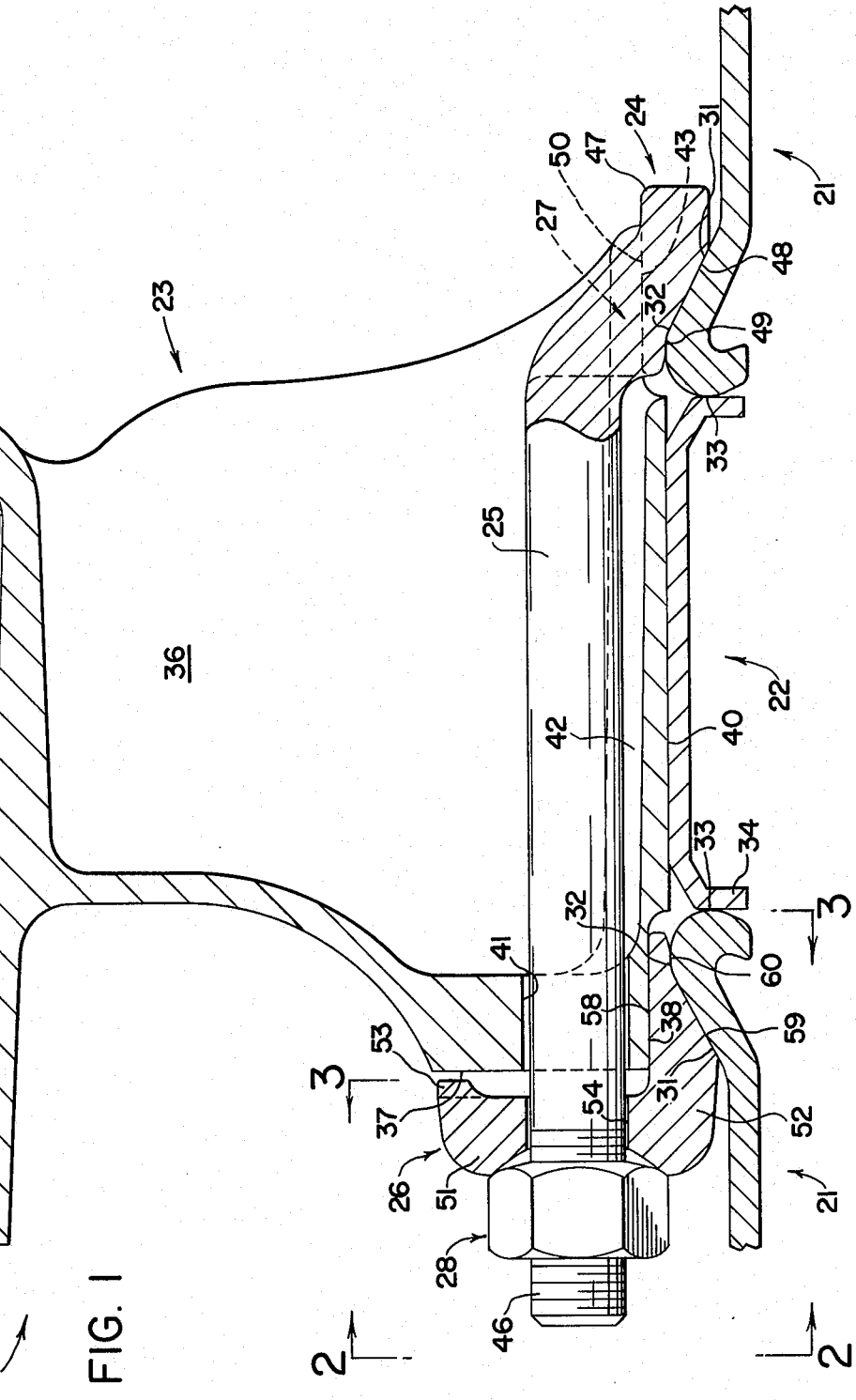
FIG. 1 is a fragmentary sectional view of a dual rim and wheel assembly according to the invention.

A dual rim and wheel assembly according to the invention is referred to generally by the numeral 20. The dual inner and outer rims are referred to generally by the numeral 21. The separating spacer is referred to generally by the numeral 22. The wheel is referred to generally by the numeral 23. The series of axially inner clamp means are referred to generally by the numeral 24, with the fastening elements 25 therefor being described in further detail below. The series of axially outer clamp lugs are referred to generally by the numeral 26. The positive positioning means for the clamp means 24, on the peripheral portion of the wheel 23 are referred to generally by the numeral 27. The fastening means for the fastening elements 25 are referred to generally by the numeral 28.

Each rim 21 may be a conventional flat base rim having a fixed bead flange and a removable bead flange (not shown). As shown, the mounting flange of a rim 21 has an axially inner holding surface 31, preferably inclined at an angle at 28° from the rotational axis of the rim. The holding surface 31 intersects and merges into a radially inner seating surface 32, preferably axially oriented substantially horizontal or parallel to the rotational axis of the rim. The seating surface 32 intersects and merges into an axially outer gutter or positioning surface 33, preferably radially oriented substantially vertical or perpendicular to the rotational axis of the rim. The rim mounting surfaces 31, 32 and 33 depict a conventional form of a mounting flange for rims which may be assembled on a wheel according to the invention. The angularity of these surfaces could be varied somewhat in relation to the rotational axis of the rims while still utilizing the subject matter of the invention.

Figure 5:
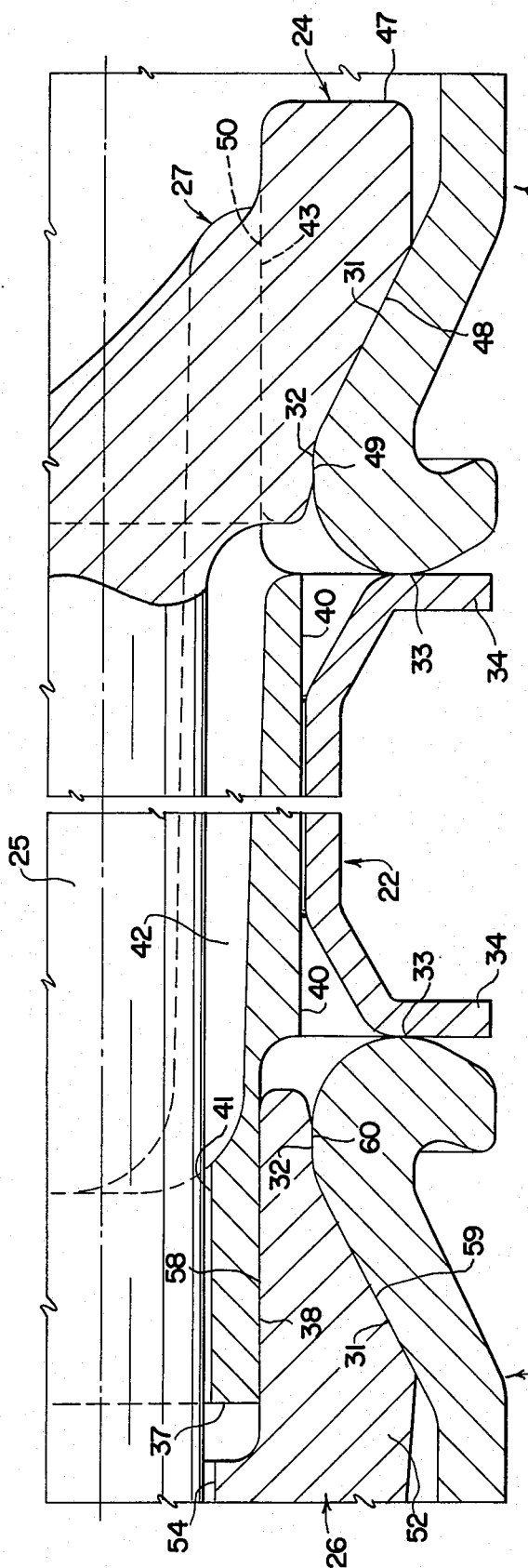
FIG. 5 is a fragmentary sectional view illustrating movement of a clamp means and a clamp lug to seat the rim flanges by tightening the fastening means, the rims being separated by a conventional rigid spacer.
Figure 7:
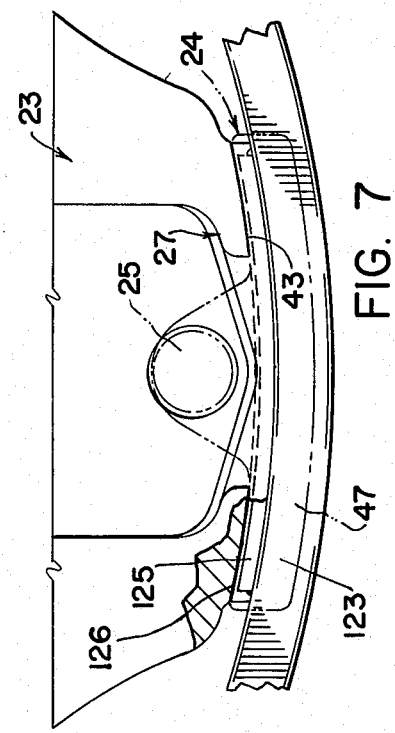
FIG. 7 is an axially inner plan view, comparable to FIG. 3, taken substantially as indicated on line 7—7 of FIG. 6.

The rigid spacer 22, as shown in FIGS. 1 and 5, is a conventional annular spacer or spacer ring carried on a wheel surface. The spacer has lateral flanges or marginal portions 34 carried by a noncompressible medial portion. The spacer edges 34 are preferably oriented substantially vertical or perpendicular to the rotational axis of the wheel 23.

The wheel 23 may be either a cast spoked wheel or a disc wheel, formed by stamping or forging. As shown, the wheel 23 is a spoked wheel having a conventional hub area 35. Any desired number of spokes 36, preferably five or six, extend radially of the hub area 35.

The peripheral portion of each spoke 36 has a boss surface 37 radially oriented substantially vertically or perpendicular to the rotational axis of the wheel, an intersecting concave surface 38 axially oriented substantially horizontal or parallel to the rotational axis of the wheel, and a larger diameter axially extended medial surface 40 oriented substantially horizontal or parallel to the rotational axis of the wheel. The surfaces 38 seat the clamp lugs 26. The surfaces 40 carry the spacer 22.

An axially oriented bore 41, for loosely receiving the shank of the fastening elements in the form of support bolts 25 for the clamp means 24 and clamp lugs 26, extends through the peripheral portion of a wheel 23 radially inwardly of the surface 38. The outer end of a bore 41 opens onto boss surface 37. The inner end of a bore 41 opens into an open area 42 radially inwardly of the medial surface 40. The open area 42 extends axially of the wheel peripheral portion and is bounded by parallel structures providing the positive positioning means 27.

As shown, the clamp means 24 may be provided by a series of individual elements as described in detail below. In this embodiment, clamp means 24 are positively positioned by sliding contact with sets of parallel surfaces 43 axially oriented substantially horizontal or parallel to the rotational axis of the wheel, on the radially outer side of the wheel peripheral structures defining the open area 42 and on opposite sides of a support bolt 25.

The clamp means 24 may be a series of one-piece solid elements. The bolt portion 25 thereof, threaded as at 46 for engagement with a fastening means 28 in the form of a nut, extends through a wheel bore 41 and parallel to the wheel surface 40 to join with a wedge portion 47. The radially outer face of a wedge portion 47 has a conical surface 48 and an intersecting axially oriented surface 49. A conical surface 48 matingly engages a correspondingly inclined inner rim flange mounting surface 31. An axially oriented surface 49 matingly engages an inner rim flange seating surface 32. The radially inner face of a wedge portion 47, on opposite sides of the juncture point with the bolt portion 25, has axially oriented surfaces 50 for slidingly engaging the surfaces 43 on the wheel when the fastening means are tightened.

While not shown in the drawings, the clamp means 24 could be made in the form of a full-circle or ring member carrying a series of support bolts for insertion through a series of wheel bores 41 and a series of intersecting rim flange engaging surfaces 48 and 49. This alternative form of a clamp means 24 could be utilized without departing from the subject matter of the invention.

A clamp lug 26 may be provided for each support bolt 25. A clamp lug 26 has a radially directed leg 51 and an axially directed leg 52 and the general shape of a conventional clamp lug, such as element 14 disclosed in U.S. Pat. No. 3,160,441, patented December/1964 to The Dayton Steel Foundry Company.

A clamp lug radial leg 51 is generally triangular in shape having an apex with a radially oriented stop surface 53. The stop surface 53 projects axially toward a wheel boss surface 37. A leg 51 also has an axially oriented bore 54 for receiving a support bolt 25. The bore 54 is centered so that a support bolt 25 will be axially oriented substantially horizontal or parallel to the rotational axis of the wheel when a clamp lug axial leg 52 is seated on a wheel surface 38.

A clamp lug axial leg 52 has an axially oriented convex surface 58 for sliding and seating engagement with a wheel surface 38. The radially outer face of the axial leg 52 has a conical surface 59 and an intersecting axially oriented surface 60. A conical surface 59 matingly engages a correspondingly inclined outer rim flange mounting surface 31. An axially oriented surface 60 matingly engages an outer rim flange seating surface 32.

Figure 6:
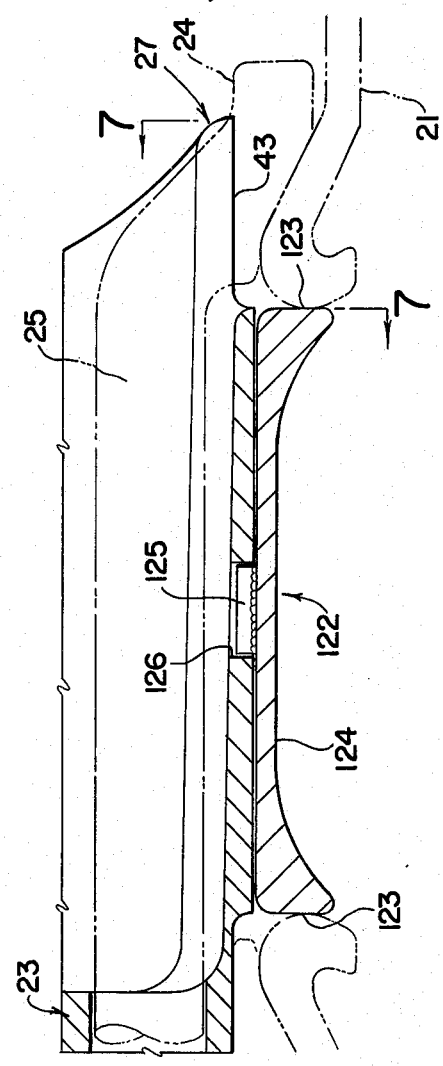
FIG. 6 is another fragmentary section view, illustrating another form of rigid spacer, the subject matter of co-pending application Ser. No. 252,413 filed May 11, 1972, used in a dual rim and wheel assembly according to the invention.

Referring to FIG. 6, an alternative form of rigid spacer 122, the subject matter of co-pending application Ser. No. 252,413 filed May 11, 1972 may be used with an assembly 20. The spacer 122 is an annular member having lateral edges 123, preferably radially oriented substantially vertical or perpendicular to the rotational axis of the wheel 23, strengthened structurally to resist extreme tightening forces. The strengthening is provided by a generally concave medial portion 124 extending edge-to-edge. The radially inner face of a spacer 122 carries a series of medially located alignment blocks 125 received in correspondingly dimensioned circumferential slots in the spoke ends of a wheel 23.

When utilizing the assembly 20 according to the invention, the clamp means are positioned with the support bolts projecting outwardly through the wheel bores. The inner rim (carrying a tire) is fitted over the wheel until the rim flange mounting surface contacts the clamp means. The spacer is then fitted on the wheel against the inner rim. Then, the outer rim is lifted into place and the clamp lugs are sequentially mounted on the support bolts.

Referring to FIG. 5, installation of the clamp lugs will tend to "arc" or cam the outer rim flange into a proper radial position. The outer rim will be centered radially at the beginning or entry portion of the clamp lug seating surfaces. Thereafter, tightening of the nuts will draw the positively guided clamp means axially outwardly to seat the inner rim flange. Continued tightening of the nuts will precisely and accurately move the inner and outer rim flange positioning surfaces 33 into contact with the spacer edges 34 correctly mounting the dual tire carrying rims.

What is claimed is:

1. A dual rim and wheel assembly comprising, a wheel (23), a rigid spacer (22), a series of axially inner clamp means (24) and a series of axially outer clamp lugs (26) to cooperatively engage mounting surfaces (31, 32) on the flanges of inner and outer rims (21), said clamp means (24) each being a one-piece solid element having a support bolt (25) joined to a wedge portion (47) with a radially outer face having a conical surface (48) for mating engagement with a correspondingly inclined inner rim flange mounting surface (31) and an intersecting axially oriented surface (49) for mating engagement with an inner rim flange seating surface (32), said support bolt (25) extending axially through said wheel and a clamp lug (26) and carrying fastening means (28) attached axially outwardly of the wheel and said clamp lug, said clamp lugs (26) each having intersecting surfaces (60, 59) thereon for engaging an axially inner surface (31) and a radially inner surface (32) on the flange of the outer rim, the clamp means and clamp lugs being drawn axially together to seat the rim flanges against said spacer by the tightening of said fastening means on said support bolts.

2. A dual rim and wheel assembly comprising, a wheel (23), a rigid spacer (22), a series of axially inner clamp means (24), and a series of axially outer clamp lugs (26), to cooperatively engage mounting surfaces (31, 32) on the flanges of inner and outer rims (21), said wheel (23) having spokes (36) extending radially of a hub area (35), the peripheral portion of each said spoke (36) having a boss surface (37) radially oriented substantially perpendicular to the rotational axis of the wheel, an intersecting concave surface (38) axially oriented substantially parallel to the rotational axis of the wheel, and a larger diameter axially extended medial surface (40) oriented substantially parallel to the rotational axis of the wheel, said wheel (23) further having an axially oriented bore (41) extending through a spoke (36) radially inwardly of said concave surface (38), the outer end of each said bore (41) opening onto a boss surface (37), the inner end of each said bore (41) opening into an open area (42) radially inwardly of said medial surface (40), each said open area (42) extending axially of a spoke and being bounded by sets of parallel surfaces (43) axially oriented substantially parallel to the rotational axis of said wheel, said parallel surfaces (43) providing means for the positioning of said clamp means (24) while engaging said mounting surfaces (31, 32) on the flange of an inner rim (21), said clamp means (24) each being one-piece solid element having a support bolt (25) joined to a wedge portion (47) with a radially outer face having a conical surface (48) for mating engagement with a correspondingly inclined inner rim flange mounting surface (31) and an intersecting axially oriented surface (49) for mating engagement with an inner rim flange seating surface (32), the radially inner face of a clamp means wedge portion (47), on opposite sides of the juncture point with said support bolt (25), having axially oriented surfaces (50) for slidingly engaging said parallel wheel surfaces (43), said support bolt (25) extending through a wheel bore (41) and a clamp lug (26) and carrying fastening means (28) attached axially outwardly of the wheel and said clamp lug, said clamp lugs (26) each having an axially directed leg (52), each said axial leg having an axially oriented convex surface (58) for sliding engagement with a concave surface (38) on said wheel, the radially outer face of an axial leg having intersecting surfaces (59, 60) thereon for engaging an axially inner surface (31) and a radially inner surface (32) on the flange of an outer rim (21), the clamp means (24) when positioned by said parallel wheel surfaces (43) and the clamp lugs (26) when engaged with said concave wheel surfaces (38) being drawn axially together to seat the rim flanges against said spacer seated on said medial wheel surface (40) by the tightening of said fastening means on said support bolts.

* * * * *